United States Patent

[11] 3,545,821

| [72] | Inventor | Albin R. Erickson<br>Roseau, Minn. |
|---|---|---|
| [21] | Appl. No. | 793,704 |
| [22] | Filed | Jan. 24, 1969 |
| [45] | Patented | Dec. 8, 1970 |
| [73] | Assignee | Textron, Inc.<br>Providence, R.I.<br>a corporation of Delaware, by mesne assignments |

[54] TRACK SUSPENSION SYSTEM FOR SNOWMOBILES
13 Claims, 8 Drawing Figs.

[52] U.S. Cl. .................................................. 305/24, 180/5
[51] Int. Cl. ................................................... B62d 55/10
[50] Field of Search .................................... 305/24, 27, 28; 180/5

[56] References Cited
UNITED STATES PATENTS

| 1,488,629 | 4/1924 | Wick | 305/24 |
| 2,284,075 | 5/1942 | Tucker | 180/5 |
| 2,339,886 | 1/1944 | Shannon | 180/5 |
| 3,221,830 | 12/1965 | Walsh | 180/5 |
| 3,485,312 | 12/1969 | Swenson | 305/24X |
| 984,914 | 2/1911 | Heidenheimer | 280/11 |

*Primary Examiner*—Richard J. Johnson
*Attorneys*—Merchant & Gould

ABSTRACT: A drive track suspension including one or more elongated slide rails for sliding engagement with the lower ground-engaging run of an endless flexible drive track for a snowmobile or like vehicle, and support structure mounting a slide rail for generally vertical movements relative to the vehicle frame. The slide rail includes an elongated upper resilient backing section superimposed on an elongated lower drive run engaging skid section.

INVENTOR.
ALBIN R. ERICKSON
BY
Merchant & Gould
ATTORNEYS

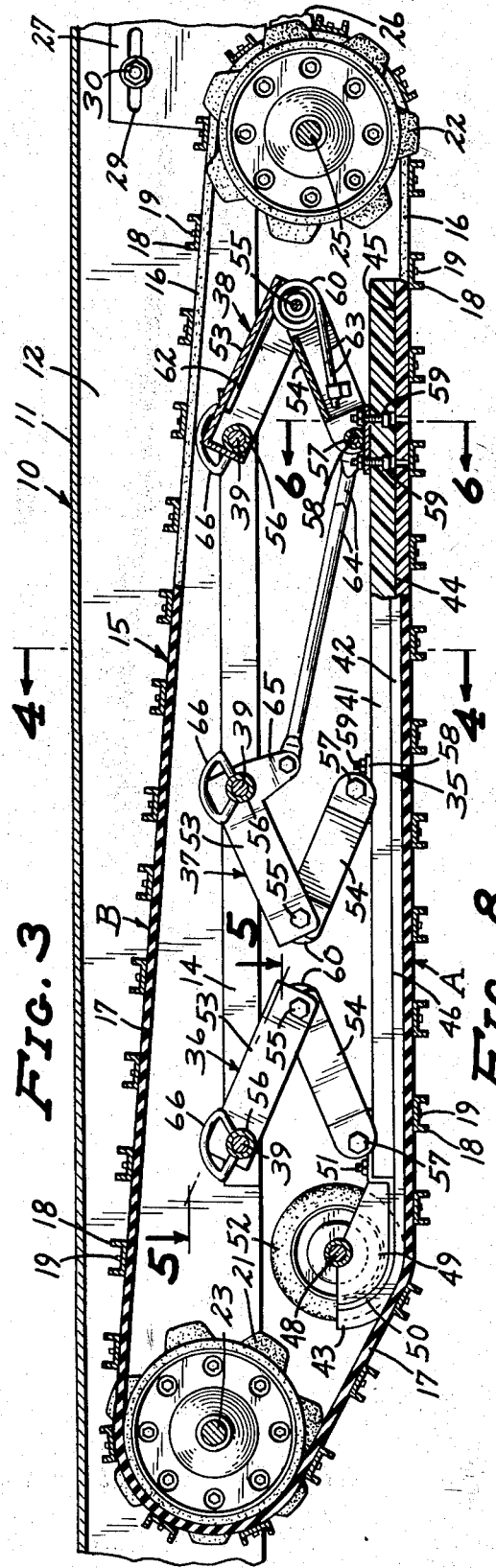

3,545,821

1

TRACK SUSPENSION SYSTEM FOR SNOWMOBILES

BACKGROUND OF THE INVENTION

Heretofore, various drive track mounting systems for snowmobile drive tracks have been employed, such as bogie wheels, slide rails, and combinations thereof, which engage the lower drive run of an endless flexible drive track that is entrained over drive and idler sprocket wheels spaced longitudinally of the vehicle, to hold the lower drive run in engagement with the surface over which the vehicle is driven.

In traversing hard, smooth surfaces, such as ice and well-packed or hard crusted snow, bogie wheels provide a highly satisfactory means of suspension. However, when the vehicle is driven over soft deep snow or slushy snow or ice, the drive run of the track arches upwardly between longitudinally spaced bogie wheels and requires greater power to maintain a given ground speed. Slide rails heretofore produced, while being more effective in supporting the lower drive track run in a longitudinally generally flat condition, have the disadvantage of short life due to wear, and must be replaced relatively often.

SUMMARY OF THE INVENTION

The suspension system of this invention includes one or more slide rails each comprising an upper backing section and a lower drive track engaging section, the upper section comprising an elongated normally straight bar of resilient material having memory characteristics and high tensile strength, such as a bar composed of longitudinally extending resilient glass fibers held together with a suitable binding material such as a synthetic plastic material. The lower section comprises an elongated strip of somewhat flexible material such as polytetrafluoroethylene, high density polyurethane, or other material having, with the portion of the drive track engaged thereby, a low coefficient of friction. The skid section is mounted on the backing section for quick and easy replacement of the skid section only when the same becomes unduly worn. The resilience of the backing strip enables the slide track to bend longitudinally, so as to enable the same to exert even downward pressure over the full length of the lower drive run portion of an endless flexible drive track engaged thereby, when traveling over uneven terrain, for efficient traction. A plurality of longitudinally spaced mounting legs connect longitudinally spaced portions of the slide rail or rails to the frame structure of the vehicle for generally vertical movements of the slide rails, each of the legs comprising a pair of angularly displaced upper and lower leg sections pivotally connected together at their inner ends to provide a knee joint. The outer ends of the upper and lower leg sections are pivotally connected to the vehicle frame structure and slide rail respectfully. Holding means, in the nature of one or more control arms, are arranged to restrain the slide rail or rails against movements longitudinally of the vehicle frame structure.

DESCRIPTION OF THE DRAWINGS

FIG. 3 is a longitudinal section taken substantially on the line 3–3 of FIG. 2;

FIG. 4 is a transverse section taken on the line 4–4 of FIG. 3;

FIG. 5 is a fragmentary horizontal section taken substantially on the line 5–5 of FIG. 3;

FIG. 6 is an enlarged fragmentary transverse section taken on the line 6–6 of FIG. 3;

FIG. 8 is a view corresponding to FIG. 2, on a reduced scale, and showing the structure of FIG. 7.

2

DETAILED DESCRIPTION

Figure 1:
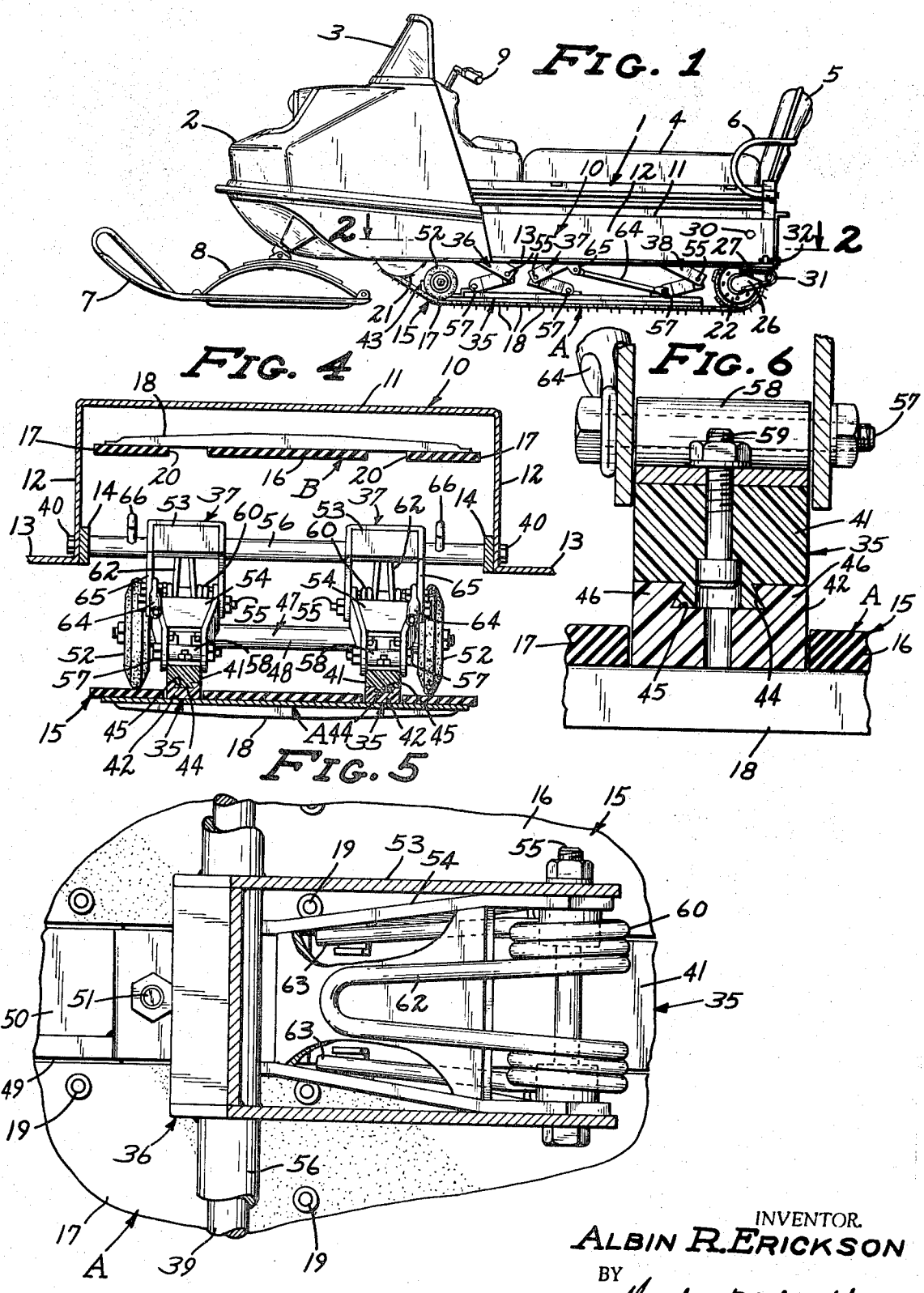
FIG. 1 is a view in side elevation of a drive track equipped vehicle, such as a snowmobile, utilizing the suspension system of this invention.

A vehicle particularly adapted for travel over snow or ice, and commonly known as a snowmobile, is shown in FIG. 1 as comprising an elongated body structure 1, having mounted on its front end portion a hood 2 on which is mounted a windshield 3. Rearwardly of the hood 2 is a seat pad 4 for the driver and one or more passengers. At the rear end of the frame 1 is provided an upwardly projecting back rest 5 provided with arm rests 6, one of which is shown. The front end of the vehicle is supported and steered by a pair of dirigible ski elements 7 carried by leaf springs 8 and controlled from the driver's seat by steering handle bars 9 and conventional steering linkage, not shown. A driving motor in the nature of an internal combustion engine, not shown, is mounted in the usual manner within the hood 2. The body structure 1 includes an elongated cross-sectionally channel-shaped rigid body member 10, having a horizontally disposed top wall 11, laterally spaced vertical side walls 12, and longitudinal side flanges or running board portions 13 that project laterally outwardly from the bottom portions of the side walls 12 and 52 foot-rests for the driver and passengers of the vehicle. The body or frame structure 1 further includes a pair of longitudinal reinforcing frame members 14 that are suitably anchored to the inner surfaces of the side walls 12 adjacent the bottom portions thereof.

Figure 2:
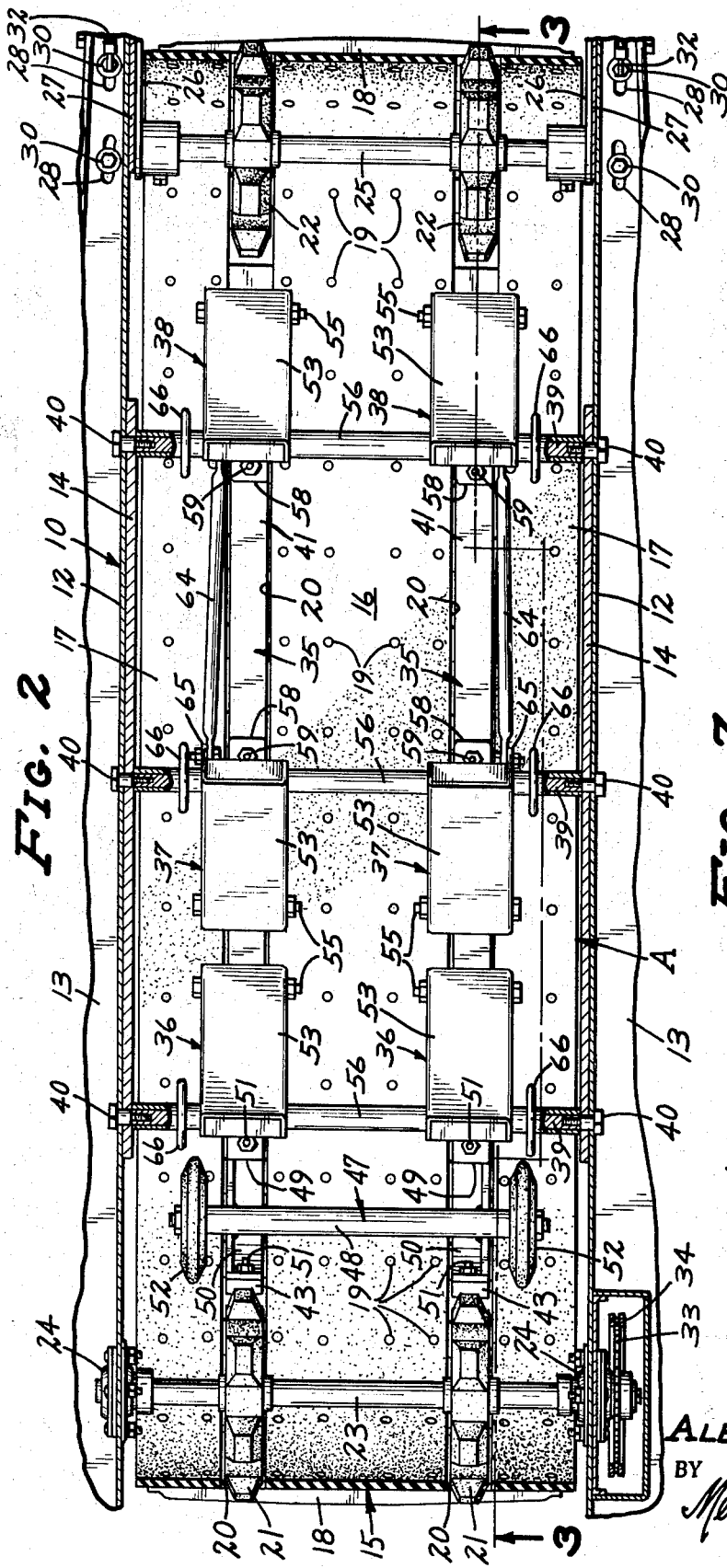
FIG. 2 is an enlarged horizontal section taken substantially on the line 2–2 of FIG. 1, some parts being broken away.
Figure 7:
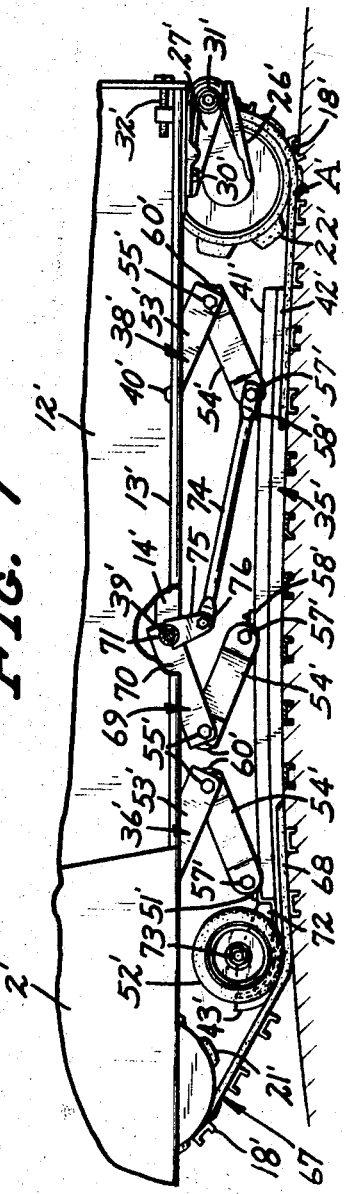
FIG. 7 is an enlarged fragmentary view corresponding to a portion of FIG. 1, but showing a modified arrangement.

An endless flexible drive track 15 cooperates with the skis 7 to support the snowmobile, and is utilized to propel the same over the ground. In the embodiment illustrated in FIGS. 1—6, the drive track 15 is shown as comprising an endless flexible intermediate belt 16, a pair of endless flexible outer belts 17 disposed in laterally spaced parallel relationship to the opposite side edges of the intermediate belt 16, and a plurality of transverse cross-sectionally channel-shaped driving cleats 18 rigidly secured to the belts 16 and 17 by rivets or like fastenings 19 in spaced apart parallel relationship longitudinally of the drive track 15. The belts 16 and 17 are preferably made from woven fabric impregnated rubber or similar material, the cleats 18 being of metal. The cleats 18 cooperate with the adjacent side edges of the belts 16 and 17 to define openings 20 for reception of the teeth of a pair of drive sprocket wheels 21 and a like pair of idler sprocket wheels 22, the drive sprocket wheels 21 being rigidly mounted on a transverse drive shaft 23 that is journaled in bearings 24 mounted on the opposite side walls 12 of the body member 10. The idler sprockets 22 are journaled on a transverse shaft 25, mounted at its opposite ends to a pair of mounting legs 26 that are pivotally mounted to a pair of brackets 27 longitudinally adjustably mounted on the rear end portion of the body member 10, see particularly FIGS. 1—3 and 7. As therein shown, the running boards 13 and brackets 27 are provided with longitudinally extending slots 28 and 29 respectively for reception of nut-equipped clamping screws 30 for releasably holding the brackets 27 against movements longitudinally of the body member 10, and torsion springs 31, one of which is shown in FIG. 7, yieldingly urge the legs 26 in a downward direction of swinging movement about the axes of their pivotal connections to the mounting brackets 27. As shown in FIG. 2, each idler sprocket 22 is disposed in alignment with a different one of the drive sprocket wheels 21, the drive track 15 being entrained over the sprocket wheels 21 and 22. Tension of the drive track 15 is adjusted by a pair of conventional adjustment screws 32 that are utilized to move the brackets 27 longitudinally of the vehicle frame 1, the brackets 27 being securely locked in place by the clamping screws 30. Also, as shown in FIG. 2, a drive sprocket wheel 33 is fixedly mounted on the drive shaft 23 and has entrained thereover an endless link chain 34 that is operatively connected to the vehicle drive motor, not shown, in the well-known manner.

The track suspension system illustrated in FIGS. 1—6 comprises a pair of generally horizontal slide rails 35 disposed in laterally spaced parallel relationship and extending longitudinally of the vehicle, pairs of laterally spaced front, intermediate and rear supporting legs 36, 37 and 38 respectively, and longitudinally spaced transverse mounting shafts 39, one for each pair of the legs 36, 37 and 38, each of the shafts 39 being rigidly mounted at its opposite ends to the reinforcing frame members 14 by suitable means, such as anchoring screws 40.

The drive track 15 defines a generally horizontal lower drive run A and an upper return run B between the drive and idler sprocket wheels 21 and 22 respectively, the slide rails 35 engaging the cleats 18 of the lower drive run A between the intermediate belt 16 and respective ones of the outer belts 17. Each slide rail 35 comprises an elongated upper backing section 41 and an elongated lower slide or skid section 42, the backing section being made from resilient material having memory characteristics, such as a multiplicity of elongated flexible gas fibers extending longitudinally of the backing section and molded together with a suitable binder of synthetic plastic material. The lower slide or skid sections 42 are each made from suitable material such as polytetrafluoroethylene, commonly known as "teflon," high density polyurethane or similar materials having, with the metallic cleats 18, a low coefficient of friction. Preferably, the slide or skid sections 42 are of greater length than the backing sections 41, the skid sections 42 having forwardly and upwardly curved front end portions 43 projecting forwardly of the front ends of their respective backing sections 41, see particularly FIG. 3. Each backing section 41 is formed to provide a longitudinally extending dovetail tongue 44 that is longitudinally slidably received in a dovetail groove 45 in each of the skid sections 42, opposite sides of each dovetail groove 45 being defined by longitudinal ribs 46 on the skid sections 42. See particularly FIG. 6. Each skid section 42 is releasably anchored to its respective backing section 41 against movements relative to each other longitudinally of the slide rails 35 by bracket led on opposite end portions of the transverse shaft 48. The guide wheels 52 are also effective in preventing the cleats 18 from catching on the extreme front ends of the arcuate skid section end portions 43 when undue slack may occur in the belt during operation of the vehicle over extremely rough terrain. skid sections 42. The bracket members 49 each have forwardly and upwardly curved surface portions 50 that correspond to the arcuate or curved front end skid section portions 43, the bracket members 49 being secured to the backing sections 41 and skid sections 42 by nut-equipped screws or studs 51. With this arrangement, it is necessary to replace only the skid sections 42 when the slide rails 35 become worn to a point where replacement is necessary, removal and replacement of these skid sections 42 being easily accomplished in a minimum of time. For the purpose of preventing undue wear on the arcuate or curved portions 43 of the skid sections 42 by the drive track 15, I provide a pair of guide wheels 52 that are journaled on opposite end portions of the transverse shaft 48. The guide wheels 52 are also effective in preventing the cleats 18 from catching on the extreme front ends of the arcuate skid section end portions 43 when undue slack may occur in the belt during operation of the vehicle over extremely rough terrain.

The supporting legs 36, 37 and 38 each comprise a pair of angularly displaced upper and lower leg sections 53 and 54 respectively, pivotally connected at their end portions by pivot bolts or the like 55 disposed on horizontal axes extending transversely of the vehicle to provide a knee joint therebetween.

The outer ends of the upper leg sections 53 of each pair thereof are welded or otherwise rigidly secured to a different one of a plurality of transverse tubular sleeves 56, each of which is journaled on a different one of the transverse shafts 39. The outer ends of the lower leg sections 54 are each pivotally secured, by means of nut-equipped pivot bolts 57, to bearing brackets 58 vertically downwardly spaced from respective ones of the shafts 39 and secured to respective ones of the slide rail backing sections 41 by nut-equipped screws or the like 59. It will be noted that the pivot bolts 57 are disposed on generally horizontal transverse axes parallel to the axes of the pivot screws 55 and transverse shafts 39. The leg sections 53 and 54 of each of the legs 36—38 are yieldingly urged in a direction to increase the angular displacement therebetween so as to yieldingly urge the slide rails 35 into engagement with the lower drive run A of the drive track 15, by torsion springs 60 having coil portions 61 loosely encompassing the pivot screws 55 and arm portions 62 and 63 operatively engaging respective ones of the upper and lower leg sections 53 and 54 respectively, see particularly FIGS. 3 and 5.

It will be noted that the leg sections 53 and 54 of the front and rear pairs of legs 36 and 38 converge in a rearward direction, whereas the leg sections 53 and 54 of the intermediate pair of legs 37 converge forwardly toward the knee joint axis defined by their respective pivot screws 55.

Holding means for restraining the slide rails 35 against movements longitudinally of the vehicle frame comprises a pair of rigid control arms 64 each pivotally connected at one end to a different one of the pivot bolts 57 associated with the rear legs 38, and at its other end to one of a pair of lever arms 65 each integrally formed with the upper leg section 53 of a different one of the intermediate legs 37, see particularly FIGS. 2 and 3. The lever arms 65 are disposed substantially normal to the longitudinal dimension of their respective leg sections 53, and partake of generally horizontal forward and rearward movement responsive to upward and downward swinging movements of their respective leg sections 53, whereby to substantially compensate for slight longitudinal movements which might otherwise be imparted to the slide rails 35 during upward and downward swinging movements of the lower leg sections 54. With this arrangement, when the vehicle traverses rough or uneven terrain, causing the same to bounce, the slide rails move substantially vertically with a minimum of longitudinal movement thereof, the control arms 64 permitting free vertical movement of the rear end portions of the slide rails 35 and the torsion springs 60 providing effective cushioning for the vehicle and effectively holding the slide rails 35 against the lower drive run A of the drive track 15 at all times. Under hard bouncing conditions, the upper return run B of the drive track 15 is prevented from rubbing against the adjacent ends of the several leg sections 53 by laterally spaced pairs of arcuate slide or skid members 66 that are welded or otherwise rigidly secured to adjacent ones of the tubular sleeves 56.

In the modified form of the invention illustrated in FIGS. 7 and 8, those parts which are identical to corresponding parts illustrated in 1—6 carry the same reference numerals with prime marks added. The modified form of the invention utilizes a single drive sprocket wheel 21' and a single idler sprocket wheel 22' over which is entrained an endless flexible drive track 67 comprising a pair of laterally spaced parallel endless rubberlike belts 68 connected by a plurality of longitudinally spaced transverse cleats 18'. The drive track 67 has meshing engagement with the drive and idler sprocket wheels 21' and 22' in the same manner as does the drive track 15 with the sprocket wheels 21 and 22. The slide rail 35' is supported by front and rear legs 36' and 38' respectively, and an intermediate leg 69 comprising an upper leg section 70 and a cooperating lower leg section 54', the upper leg section 70 being welded at its outer end to a transverse tubular sleeve 71 rotatively mounted on the intermediate transverse shaft 39'. The slide rail 35' is yieldingly urged downwardly into operative sliding engagement with the lower drive run A' of the drive track 67 by torsion springs 60' the front end portions of the slide rail backing and skid sections 41' and 42' being releasably anchored together by means of a bracket 72 having mounted thereon a relatively short transverse shaft 73 on which are mounted the guide wheels 52'. The slide rail 35' is held against longitudinal movements relative to the vehicle frame 1' by a pair of rigid control arms 74 having rear ends pivotally mounted on the rear pivot screw 57' and front ends pivotally connected each to a different one of a pair of lever arms 75 that are welded or otherwise rigidly secured to laterally spaced portions of the tubular sleeve 71, the pivotal 3,545,821 connection of the control arms 74 to the lever arms 75 being in the nature of pivot bolts or the like 76. With reference to FIG. 8, it will be seen that the lever arms 75 are relatively widely spaced apart on the tubular sleeve 71, so that the control arms 74 converge rearwardly toward their connection 57' with the slide rail 35' and lower leg section 54' of the rear leg 38', whereby to aid in holding the slide rail 35' against lateral movements relative to the drive track 67.

FIG. 7 illustrates the manner in which the slide rail 35' bends or curves to follow a rolling or uneven terrain, so that substantially the full length of the lower drive run of the drive track 67 follows the contour of the underlying snow or ice. Although not shown, it has been found that a pair of laterally spaced side rails, such as shown at 35 in FIGS. 1—6, follow the contours of the ground in the same manner. Further, the tendency of the slide rails 35 and 35' to quickly return to or be maintained in a longitudinally straight condition aids the lower drive runs A and A' to remain longitudinally generally flat in deep soft snow or on soft slushy ice. Thus, better traction and more efficient utilization of driving power is achieved with the above-described suspension means than has heretofore been obtained. Further, replacement of only the skid sections 42 and 42' instead of the entire slide rails 35 and 35', when the skid sections thereof become unduly worn, provides for a substantial savings in the maintenance of the vehicle.

I claim:

1. A drive track suspension system for a snowmobile including an elongated frame structure having front and rear portions, surface engaging runners for supporting the front end portion of the snowmobile, longitudinally-spaced aligned drive and idler wheels supported by the frame structure, and an endless flexible drive track entrained over said wheels and having a lower generally horizontal drive run and an upper return run, said suspension system comprising:
   a. an elongated slide rail extending longitudinally of and disposed in overlying sliding engagement with the lower drive run of said drive track;
   b. a plurality of mounting legs spaced apart longitudinally of said frame structure and each including upper and lower leg sections having inner ends pivotally secured together on a generally horizontal axis to provide a knee joint, said upper and lower leg sections being angularly displaced relative to each other and converging toward their respective knee joints and having outer ends operatively pivotally connected to said frame structure and slide rail respectively on axes fixed on said leg sections, frame structure, and slide rail, and parallel to the pivot axes of their respective knee joints to support the slide rail for generally vertical movements relative to said frame structure;
   c. yielding means urging said slide rail in a downward direction relative to said frame structure and into sliding engagement with said lower drive run;
   d. holding means for restraining the slide rail against movements longitudinally of said frame structure; and
   e. said drive track providing sole support for the rear end portion of the snowmobile.

2. The drive track suspension system defined in claim 1 in which said yielding means comprises a plurality of springs one each operatively associated with a different one of said legs, and each disposed to yieldingly urge the leg sections of its respective leg in directions of pivotal movement on the axis of the knee joint thereof to increase the angular displacement therebetween.

3. The drive track suspension system defined in claim 1 in which said legs are disposed in a generally vertical plane extending longitudinally of said frame structure, the axes of said knee joints and pivotal connections of said leg sections to the frame structure and slide rail extending transversely of said frame structure.

4. The drive track suspension system defined in claim 3 in which the leg sections of at least one of said legs extend angularly forwardly of their respective knee joint, the leg sections of an adjacent one of said legs extending angularly rearwardly of their respective knee joint.

5. The drive track suspension system defined in claim 3 in which said holding means comprises a rigid control arm pivotally secured at one of its ends to one of the upper and lower leg sections of said one of the legs and at its opposite end to the other of the upper and lower leg sections of said adjacent one of the legs.

6. A drive track suspension system for a snowmobile having an elongated frame structure, longitudinally-spaced aligned drive and idler wheels, and an endless flexible drive track entrained over said drive and idler wheels and having a lower generally horizontal drive run and an upper return run, said suspension system comprising:
   a. an elongated flexible resilient slide rail extending longitudinally of and disposed in overlying sliding engagement with the lower drive run of the drive track, and including a lower skid section and an upper backing section in superposed relationship to said skid section;
   b. means anchoring said skid section to said backing section;
   c. support structure connecting the slide rail to said frame structure for generally vertical movements relative to the frame structure and including yielding means urging said slide rail into sliding engagement of said skid section with said lower drive run; and
   d. said backing and skid sections being normally longitudinally straight for the greater part of the length thereof and flexing substantially in response to running of the drive track over rough uneven terrain to more closely follow said terrain, said backing section being sufficiently resilient to seek its said normally straight condition.

7. The drive track suspension system defined in claim 6 in which said backing section bar includes a multiplicity of longitudinally extending flexible glass fibers bonded together, said skid section strip being formed of synthetic plastic material.

8. The drive track suspension system defined in claim 6 in which said means for anchoring said skid section to the backing section comprises a longitudinally extending dovetail tongue on one of said slide rail sections and a pair of laterally spaced longitudinally extending ribs on the other of said sections defining the sides of a dovetail groove for reception of said tongue, and a bracket structure rigidly secured to said skid and backing sections at one end thereof for holding said sections against longitudinal movement relative to each other.

9. The drive track suspension system defined in claim 8 in which said bracket structure includes a longitudinally outwardly and upwardly curved surface portion, said skid section having a curved end portion corresponding to and engaging said curved surface portion.

10. The drive track suspension system defined in claim 8, characterized by a horizontally disposed shaft on said bracket structure extending transversely of the drive track, and lower drive run engaging support wheels mounted on said shaft for rotation laterally outwardly of said slide rail.

11. The drive track suspension system defined in claim 10 in which said bracket structure includes a longitudinally outwardly and upwardly extending arcuate surface portion, said skid section having an arcuate end portion corresponding to and engaging said arcuate surface portion, a generally horizontal transverse shaft carried by said bracket structure substantially on the axis of said arcuate surface portion, and lower drive run engaging support wheels mounted on said shaft for rotation laterally outwardly of said slide rail.

12. A drive track suspension system for a snowmobile having an elongated frame structure, longitudinally spaced aligned drive and idler wheels, and an flexible drive track entrained over said wheels and having a lower generally horizontal drive run and an upper return run, said suspension system comprising:
   a. a pair of laterally spaced parallel slide rails extending longitudinally of and disposed in overlying sliding engagement with the lower drive run of the drive track, each of said slide rails including upper and lower back and skid sections respectively in superposed relationship;

b. means anchoring each skid section to its respective backing section; and c. support structure connecting said slide rails to said frame structure for independent generally vertical movements relative to each other and to the frame structure and including independent yielding means urging said slide rails into sliding engagement of their respective skid sections with said lower drive run.

13. The drive track suspension system defined in claim 11, in which said means anchoring said skid sections to their respective backing sections comprises longitudinally extending dovetail connections between each backing section and its respective skid section, and bracket structure rigidly secured to said backing and skid sections at one end thereof, said bracket structure including a transverse shaft and a pair of laterally spaced lower drive run engaging support wheels mounted thereon each for rotation laterally outwardly of a different one of the slide rails.